United States Patent
Shanbhag et al.

(10) Patent No.: US 10,193,763 B2
(45) Date of Patent: *Jan. 29, 2019

(54) REDUCING MULTICAST SERVICE TRAFFIC FOR MATCHING AND STREAMING IN SDN (SOFTWARE DEFINED NETWORKING ENABLED NETWORKS

(71) Applicant: Fortinet, Inc., Sunnyvale, CA (US)

(72) Inventors: Pramod Shanbhag, Bangalore (IN); Lakshmi Narayana Dronadula, Bangalore (IN); Abhilash R, Hassan District (IN)

(73) Assignee: Fortinet, Inc., Sunnyvale, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/271,127

(22) Filed: Sep. 20, 2016

(65) Prior Publication Data

US 2018/0083791 A1  Mar. 22, 2018

(51) Int. Cl.
*H04L 12/18* (2006.01)
*H04L 12/24* (2006.01)
*H04L 12/26* (2006.01)

(52) U.S. Cl.
CPC .......... *H04L 41/20* (2013.01); *H04L 12/1886* (2013.01); *H04L 43/028* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,836,481 B1* | 12/2004 | Hotta | ........... | H04L 12/1836 370/392 |
| 9,038,151 B1* | 5/2015 | Chua | ........... | H04L 45/02 709/223 |
| 2014/0372616 A1* | 12/2014 | Arisoylu | ........... | H04L 67/1002 709/226 |
| 2015/0327024 A1* | 11/2015 | Yang | ........... | H04W 4/06 370/312 |
| 2017/0034669 A1* | 2/2017 | Dronadula | ........... | H04W 4/06 |

* cited by examiner

*Primary Examiner* — Kodzovi Acolatse
*Assistant Examiner* — The Hy Nguyen
(74) *Attorney, Agent, or Firm* — Law Office of Dorian Cartwright; Dorian Cartwright

(57) ABSTRACT

Multicast packets from streaming services on a data network are reduced. A packet conversion policy distributes OpenFlow rules to network components involved in multicasting services. In coordination with, and responsive to, detecting a matching service provider advertisement and service receiver request, executing an SDN policy governing a multicast streaming service. Specifically, multicast packets from a flow for streaming the multicast service are converted from multicast to unicast when sent from the network component associated with the service provider, and then are converted from unicast to multicast when received at the network component associated with the station.

11 Claims, 8 Drawing Sheets

REDUCING MULTICAST SERVICE TRAFFIC FOR MATCHING AND STREAMING IN SDN (SOFTWARE DEFINED NETWORKING ENABLED NETWORKS

FIELD OF THE INVENTION

The invention relates generally to computer networking, and more specifically, to efficient management of multicast service matching and streaming in a software-defined network (SDN).

BACKGROUND

Multicast streaming services allow users on a network to collectively share a network resource, such as streaming video, or an Internet radio show. For example, Bonjour by Apple, Inc. implements zero-configuration networking to easily access shared resources on a local network, such as a printer or video projector in an office. Multicast is the underlying technology enabling these streaming services.

Although multicast can be efficient by making streams available to any interested station, the technique also has some inherent inefficiencies. Copies of data packets are transmitted to each network device in a local network to make streaming services available at any point of the network. At times when few stations are subscribed to a multicast service, or when certain parts of the network are undersubscribed, network resources are wasted at devices and across the communication channels. In contrast to multicast, unicast transmits a single data packet from a source to a specific destination rather to copies of a data packet to many destinations (i.e., one-to-many rather than one-to-one). Thus, unicast can be more efficient for small audiences.

An SDN-enabled local network centrally manages layer-2 network functionality with respect to the OSI layers. In other words, routers, access points and other network components, devices or applications cede local routing decisions in favor of a centralized authority for implementing network wide policies. Further, real-time network conditions can be monitored on a global basis and adjustments to local layer 2 routing can be made in response.

What is needed is a robust technique to efficiently manage multicast service discovery, as well as efficiently manage service streaming, in SDN-enabled networks.

SUMMARY

These shortcomings are addressed by the present disclosure of methods, computer program products, and systems for reducing multicast service traffic using an SDN controller in a data communication network.

In one embodiment, a streaming multicast policy comprising one or more OpenFlow rules is distributed to a plurality of network components involved in multicasting services. At least one service discovery OpenFlow rule of the streaming multicast policy suppresses advertising packets that broadcast availability of a streaming service, and at least one OpenFlow rule suppresses service request packets for available streaming services. Data plane traffic is centrally monitored and analyzed. Monitored data from the plurality of network components from different locations on the data communication network, or packets can be tunneled to the SDN controller from each network component.

In another embodiment, responsive to one or more advertising packets of the service provider being suppressed at a first network component of the plurality of network components, notification of an advertisement packets is received. Responsive to one or more request packets of a station being suppressed at a second network component of the plurality of network components, a notification of a request packet is received. The service provider and the station are notified of a match based on comparing parameters of the advertisement packets and the request packet.

In yet another embodiment, to execute multicast service streaming according to SDN policy, at least one service streaming OpenFlow rule is distributed to at least the network component associated with the service provider and to the network component associated with the station. Data packets from a flow for streaming the multicast service are converted from multicast to unicast when sent from the network component associated with the service provider, and then are converted from unicast to multicast when received at the network component associated with the station. Intervening network hops can process packets in unicast format.

Stations can be unaware of the data packet modifications and SDN intervention.

Advantageously, the network components take advantage of an SDN infrastructure to operate more efficiently by reducing network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for reducing multicast service traffic using SDN in a wireless communication network by centrally coordinating data plane behavior. For example, Bonjour makes local computing resources easily available by multicasting copies of data packets for receiving stations and uninterested stations on a local network. Multicast streaming inefficiencies can be reduced, using layer 2 SDN management capability across the local network to eliminate unnecessary packets from being sent to uninterested stations. Packets are eliminated both in service discovery (e.g., advertisement packets) and service streaming (e.g., content packets).

One of ordinary skill in the art will recognize many additional variations made possible by the succinct description of techniques below.

Systems to Reduce Multicast Service Traffic with SDN (FIGS. 1-6)

Figure 1:
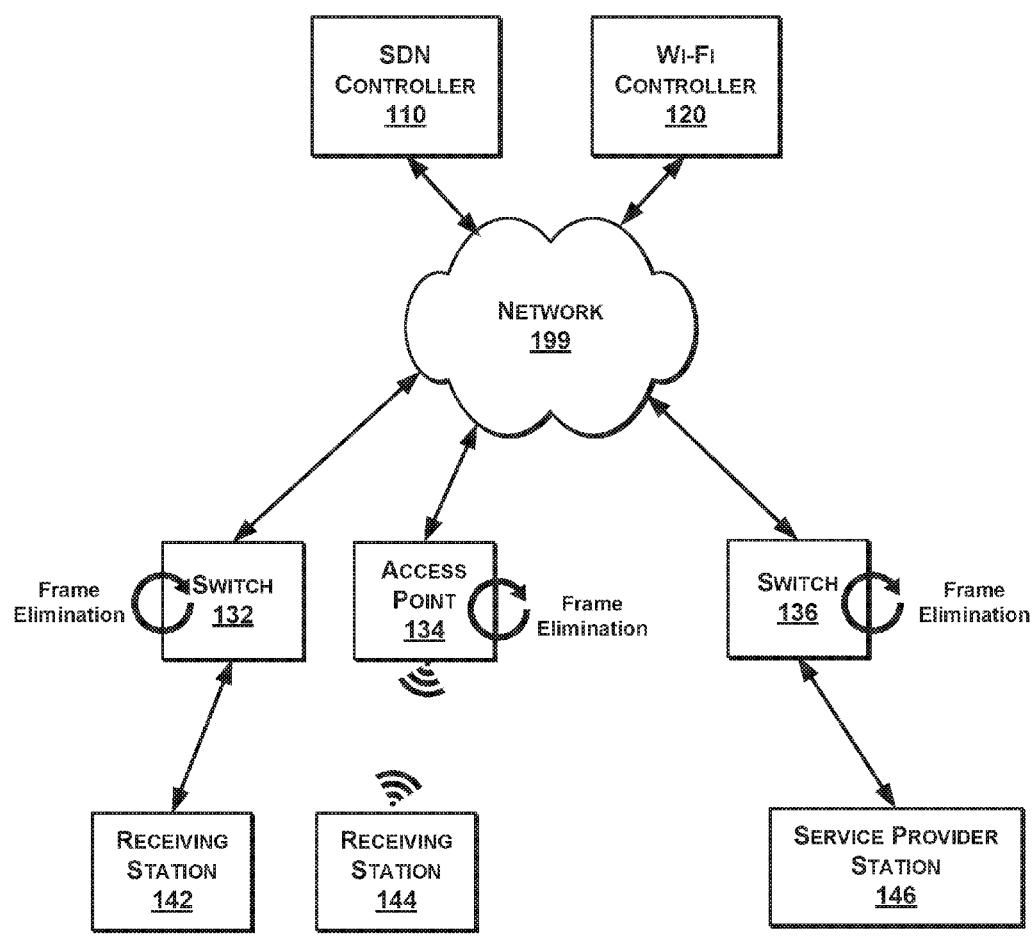
FIG. 1 is a high-level block diagram illustrating a system to efficiently manage multicast service matching and streaming from a centralized data plane in a data communication network, according to one embodiment.

FIG. 1 is a high-level block diagram illustrating a system 100 to reduce multicast service traffic using SDN, according to one embodiment. The system 100 comprises an SDN controller 110, a Wi-Fi controller 120, network edge devices (switch 132, access point 134 and switch 136), and stations (receiving stations 142, receiving station 144 and service provider station 146).

Network components can be coupled to a network 199, such as a LAN (local access network, a WAN (wide area network), the Internet, a cellular network, through any suitable wired (e.g., Ethernet) or wireless (e.g., Wi-Fi or 4G) medium, or combination. The receiving station 142 is coupled by a wire connection to the switch 132 which in turn is connected to the network 199 (i.e., network backbone components therein) preferably through a wired connection. The receiving station 144 is wirelessly connected to the access point 134 which is also connected to the network 199. The multicast service provider 146 is coupled by a wire to the switch 136 which too is connected to the network 199. The SDN controller 110 and the Wi-Fi controller 120 are also connected by wire to the network 199. Many variations are possible. For example, there can be additional components such as firewalls, routers, and more switches and stations. Additionally, components can be combined or separated, for example, the SDN controller 110 and the Wi-Fi controller 120 can be implemented with a single physical box, or, each could represent a cluster of physical boxes acting in coordination. The system 100 can be implemented locally as a LAN or be implemented in the cloud with certain components being remotely available (e.g., through a firewall).

The SDN controller 110 can use packet sniffing of packet content to identify characteristics of a streaming service. Once identified, the streaming service is subject to management by the SDN controller 110. A pattern detection engine (not shown) can identify multicast streams based on known characteristics. For example, headers of network packets can have port numbers or IP address numbers known for use in multicasting. Packet sniffing can identify other characteristics of network traffic by analyzing content from multiple packets of a stream. The streaming service may use a unique video compression format, or a unique file format that can be identified. The SDN controller 110 uses identifiers such as IP address or MAC address when formulating OpenFlow rules to control the streaming service from service provider to service receiver.

OpenFlow rules are generated by the SDN controller 110 and distributed across network components, including the switch 132, the access point 134, and the switch 136. The SDN controller 110 can receive feedback related to implementation of certain OpenFlow rules based on event monitoring services, and make adjustment in response. For example, if several multicast streams are causing congestion across a network component, specific streams can be re-routed using layer 2 rules generated at the SDN controller 110 for implementation at the network component.

In more general operations, the SDN controller 110 can implement various policies (e.g., multicast streaming service policies) for network management by centrally managing data plane communications of the system 100. The network edge devices, as well as the Wi-Fi controller 120, in some embodiments, tunnel packets to the SDN controller 110 for routing decisions. The routing decisions can be based on policies connecting higher-level commands to management of data plane behavior. Also, the routing decisions can be based on a system-wide view of layer 2 network characteristics and conditions.

Forwarded packets are analyzed by the SDN controller 110 to determine, for example, an originating application (e.g., layer 7 application or other process operating above layer 2), an operating system being used, security threats, and source and destination addresses. If no specific policy exists, general or default layer 2 factors can dominate routing decisions. If a specific policy exists, packets are treated accordingly, such as dropping packets, adjusting priority, adjusting routing, and the like. In some embodiments, a multicast streaming policy contains routing instructions for a specific multicast service. A data portion of the multicast streaming policy includes an identification of the service provider station 146 (e.g., MAC address or IP address), specific IP addresses describing routing hops, format instructions indicating whether transmissions should be multicast or unicast, and other multicast streaming information. OpenFlow rules generally provide cross-vendor communication as an abstraction of vendor-specific internal programming.

More generally, the SDN controller 110 centralizes data plane decision-making for the network edge devices shown in FIG. 1 and any other network devices within the network 199 and serve as potential intervening hops for transmitting data packets (e.g., a firewall, or a gateway). To do so, the network devices are configured to concede layer 2 routing decisions to the SDN controller 110 by forwarding packets to the SDN controller 110 for routing instructions. The SDN controller 110 can use input gathered across the network to make layer 2 routing decisions for the packets which are communicated back to the network devices for routing. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control.

Figure 10:
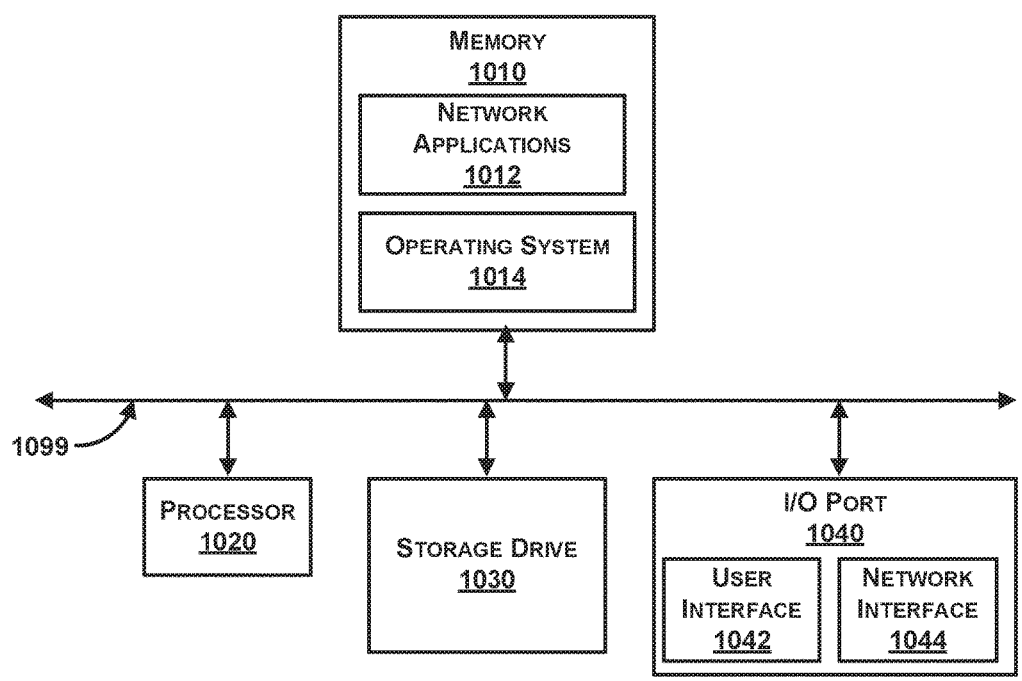
FIG. 10 is a block diagram illustrating an example computing device, according to one embodiment.

The SDN controller 110 can be, for example, a personal computer, a laptop computer, a server, a cloud-based device, a virtual device, or the like implemented in any of the computing devices discussed herein (e.g., see FIG. 10). Additional embodiments of the SDN controller 110 are discussed with respect to FIG. 2.

The Wi-Fi controller 120 manages wireless connections to the network edge devices, can manage BSSID assignments and hand-offs, and can implement Wi-Fi policies. Although the Wi-Fi controller 120 has some network-wide visibility, it is limited to Wi-Fi-relevant information for load balancing, managing a number of station connections at a particular access point, tracking BSSIDs, and the like, in some implementations. While the higher-layer decisions on the access point 134 can have some indirect impact on data plane decision making, the SDN controller 110 makes direct data plane decisions. The SDN controller policies, as implemented, can override, co-exist, or compete with Wi-Fi controller policies, and others.

The Wi-Fi controller 120 can be implemented in any of the computing devices discussed herein (e.g., see FIG. 10). For example, the Wi-Fi controller devices produced by Fortinet, Inc. of Sunnyvale, Calif. In one embodiment, the SDN controller 110 and the Wi-Fi controller 120 are integrated into a single physical device. In another embodiment, information concerning network management is passed between the SDN controller 110 and the Wi-Fi controller 120.

One embodiment of the SDN controller 110 and/or the Wi-Fi controller 120 is at least partially cloud-based. The cloud-based services can be hosted by a provider entity and accessed by a customer entity, so that customers do not have to own and maintain controllers. More embodiments of the Wi-Fi controller 120 are discussed with respect to FIG. 3.

The network edge devices (the switch 132, the access point 134, and the switch 136) implement critical components of the elimination techniques herein. These devices further provide a ramp for stations to reach the network 199, and external resources. Connections can be wired or wireless. Some embodiments of the network edge devices include SDN-compatibility. OpenFlow rules and flow tables are stored operated locally. Other embodiments of network edge devices without SDN compatibility may have to tunnel data packets to a higher-level device for processing. Network internal devices (not shown) can be part of the network 199 in between the network edge devices.

The network edge devices include one or more individual access points implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein (see e.g., FIG. 10). No special client is needed for this particular technique, although other aspects of the network may require downloads to the stations 140A-N. The stations 140A-N connect to the access points 130A-N for access to, for example, a LAN (local area network) or external networks using an RF (radio frequency) antenna and network software complying with IEEE 802.11.

Figure 2:
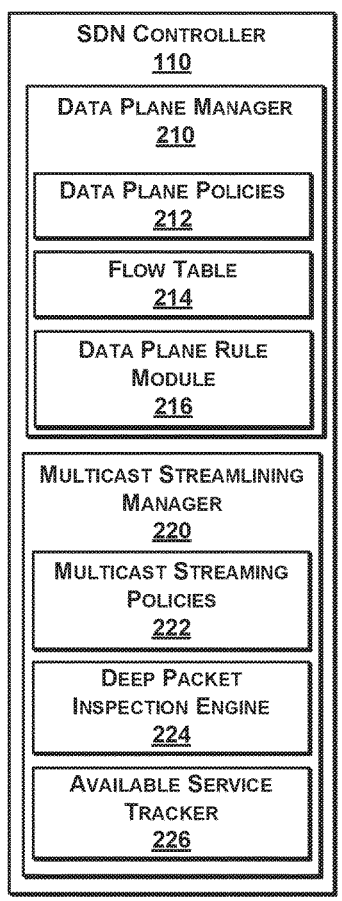
FIGS. 2-4 is a more detailed block diagram illustrating an SDN controller, a Wi-Fi controller, and a switch of the system of FIG. 1, respectively, according to some embodiments.

FIG. 2 is a more detailed block diagram illustrating the SDN controller 110 of the system 100, according to one embodiment. The SDN controller 110 comprises a data plane manager 210 and a multicast streamlining manager 220. The components can be implemented in hardware, software, or a combination of both.

The data plane manager 210 centrally manages layer 2 routing decisions. The data plane manager 210 further comprises data plane policies 212 representing a database, table, or other description of policies stored locally, remotely, or distributed. As referred to herein, data plane policies are layer 2 routing decisions that are implemented outside of intelligent Wi-Fi flow policies. For example, a policy can drop or delay certain packets, or change a priority. The SDN controller can use input gathered across the network to make layer 2 routing decisions for the packets which are communicated back to the forwarding one of the access points 120A-N. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control.

A flow table 214 of the data plane manager 210 maintains a list of current and past flows affected by various policies, including flows for multicast streaming. In some embodiments, the flow table is exported to other components along with OpenFlow rules. Generally, a flow as referred to herein comprises a series of packets between a common source address and destination address. Each flow can have individual sessions representing a file transfer, login through log off, opening through closing an application, and the like.

The data plane rule module 216 of the data plane manager 210 generates rules (e.g., OpenFlow rules, XML rules, source code, or proprietary commands) in real-time and in response to monitoring at network devices (e.g., the switch 122, the access point 124 or the switch 126) and/or deep packet inspection. Additional modules can be added for other types of analysis and action.

The multicast streaming manager 220 further comprises multicast streaming policies 222 which can be manually or automatically entered. Multicast streaming policy input can be limited to a network administrator with responsibility for a corporate network, or be user friendly enough for any user to adjust. Multicast streaming policies can also be automatically set during an initial set up file for a network device. Additionally, the system 100 can automatically discover new devices and automatically implement a multimedia streaming policy. One example of a specific multicast streaming policy is specific to services such as video streaming while another specific multicast streaming policy is specific to user, a device, a user type, a device type, a type of streaming content, a length of multicasting, a bandwidth usage, a number of subscribers, a number of current multicast streams, overall network conditions, and the like. The multicast streaming policies 222, in some cases, are combined with the data plane policies 212.

The deep packet inspection engine 224 can sniff forwarded packets to identify service advertisement, service request, specific characteristics of the service such as type of device, application, file formats, titles of video or audio, other connected users, and the like. One or more packets can be unwrapped as if being received at a destination in order to expose files or commands of higher layers. A specific application can be detected from patterns related to data field formatting, file formats, signatures, metadata, or an explicit identification. One or more packets can be unwrapped as if being received at a destination in order to expose files or commands of higher layers. Some applications can be quickly identified by markings in every packet, while other applications may require analysis of several packets before distinct patterns emerge. In some embodiments, unreliable identifications can be confirmed via query. Other characteristics such as packet frequency or size can be implicit identifiers.

The extracted information can be stored locally in an available services tracker 226, or stored remotely in other embodiments. A list of services can be sent responsive to detecting requests for services that have been suppressed. The list of services can also be sent to new stations joining the network or being handed-off from a neighboring access point.

Figure 3:
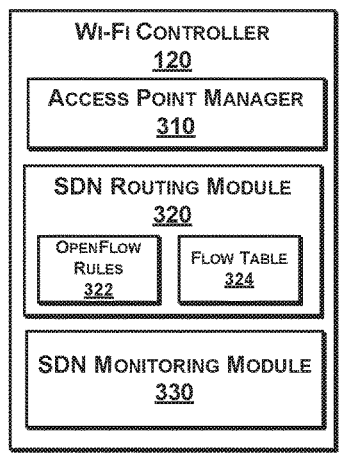

FIG. 3 is a more detailed block diagram illustrating a representative Wi-Fi controller 120 that comprises an access point manager 310, an SDN routing module 330 and a packet queue 340. The components can be implemented in hardware, software, or a combination of both.

The access point manager 310 communicates with the access point 134 and other access points for Wi-Fi functionality such as beaconing, assigning BSSIDs, and handing-off stations between access points.

Then SDN routing module 320 implements OpenFlow compatibility through an interface with the SDN controller 110. In some embodiments, the SDN routing module 320 establishes service advertisement and service request reporting to the SDN controller 110 via the SDN monitoring module 330, and establishes conversions of streaming packets from unicast to multicast, from multicast to unicast formats, or deletions, per OpenFlow rules 322. Multicast flows, and other flows, can be tracked in a flow table 324. Actions can be performed either at the Wi-Fi controller 120 when all network packets are forwarded, can be formed at the access point 134 for more autonomous edge network components, or in combination (e.g., in a passive or pass-through mode in which packets are tunneled from the access point 134 to the Wi-Fi controller 120 for routing decisions, which can also be in turn tunneled to the SDN controller 110).

The SDN monitoring module 330 communicates local feedback to the SDN controller 110. The local feedback can be statistics, metrics, data collection, conditions, parameters, configurations, capabilities, number of connected stations, layer 2 statistics and history, routing table data, and any other appropriate feedback. Global conditions or network-wide conditions can be analyzed from an aggregate of local feedback from around a local network.

Figure 4:
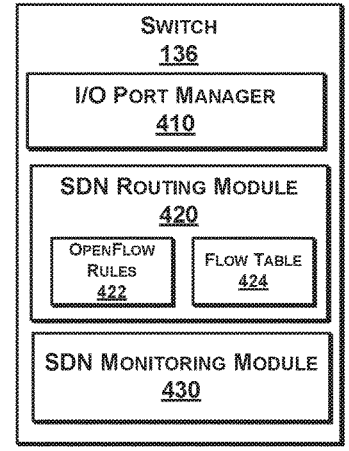

FIG. 4 is a more detailed block diagram illustrating the switch 136 of the system 100, according to one embodiment. The switch 136 comprises an I/O port manager 410, an SDN routing module 420 and an SDN monitoring module 430. Other standard components such as radios, antennae, and processors are not shown in the interest of brevity. The components can be implemented in hardware, software, or a combination of both (e.g., see FIG. 10).

The I/O port manager 410 receives data packets from a first port and transmits data packets to a second port, and in doing so, executes data plane behavior as governed by the SDN policy. When being transferred from an input queue to an output queue, data packets can be processed from multicast to unicast, from unicast to multicast, as well as being purged as part of elimination of unnecessary data packets.

The SDN routing module 420 of the switch 136 can be similar to the SDN routing module 320 of the Wi-Fi controller 120. OpenFlow rules 422 are customized to the switch 136 as determined by the SDN controller 110. The flow table 424 tracks packet streams.

The SDN monitoring module 430 also communicates local feedback to the SDN controller 110 and otherwise can operate similarly to the SDN monitoring module 330 of the Wi-Fi controller 110. The local feedback generated by the switch 136 differs due to functionality, for example, no BSSID or beacon feedback is available.

The SDN routing module 420 forwards packets and statuses to the SDN controller 110. The first few packets from new data streams can be sent to the SDN controller 110 for analysis. Alternatively, there may already be rules present that direct handling of the new data streams. Example statuses can be a download rate for a specific flow, queue capacity, routing statistics, and more. Periodic updates are made on a regular basis or responsive to change.

In a different embodiment, the switch 136 has no SDN routing module 420, so SDN operations are implemented by tunneling network packets to the SDN controller 110 and/or the Wi-Fi controller 120k for processing.

Figure 5:
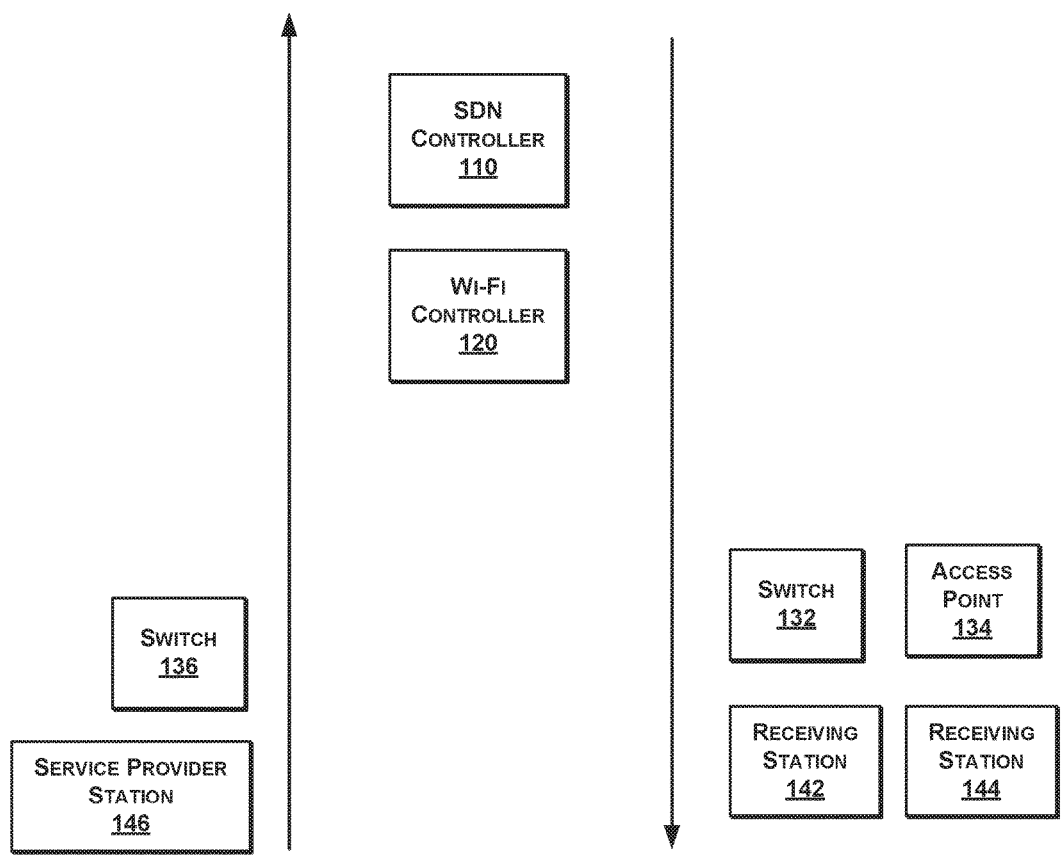
FIG. 5 is a block diagram illustrating a network hierarchy, according to some embodiments.

FIG. 5 is a block diagram illustrating network component hierarchies 500 for different modes of operation of the system 100. An SDN policy is initially implemented by the SDN controller 110, which distributes policy to network components that are SDN-capable. Hierarchies for execution of the SDN policy is dependent on whether or not tunneling is enabled.

In a default mode, in which network devices are SDN compatible and are configured for autonomy, a hierarchy for SDN policy execution can occur at a peer level in which the stations (e.g., the service provider station 146 and the receiving stations 142, 144) access a network backbone through edge devices (the switches 132, 136 and the access point 134) which locally execute OpenFlow rules in transmitting packets amongst edge devices without involving higher levels of the hierarchy 500.

In a tunnel mode of one embodiment, all system transactions for packets at local network devices are sent to the SDN controller 110 for disposition. The lower hierarchy components may not be SDN-enabled, or other legacy configurations may require this protocol. In a different tunnel mode of another embodiment, all transactions are sent to the Wi-Fi controller 120, which in turn sends all transactions to the SDN controller 110. Network components, including the access points 130A-N and in some cases the Wi-Fi controller 120 concede layer 2 routing decisions on the data plane to the SDN controller 110.

Figure 6:
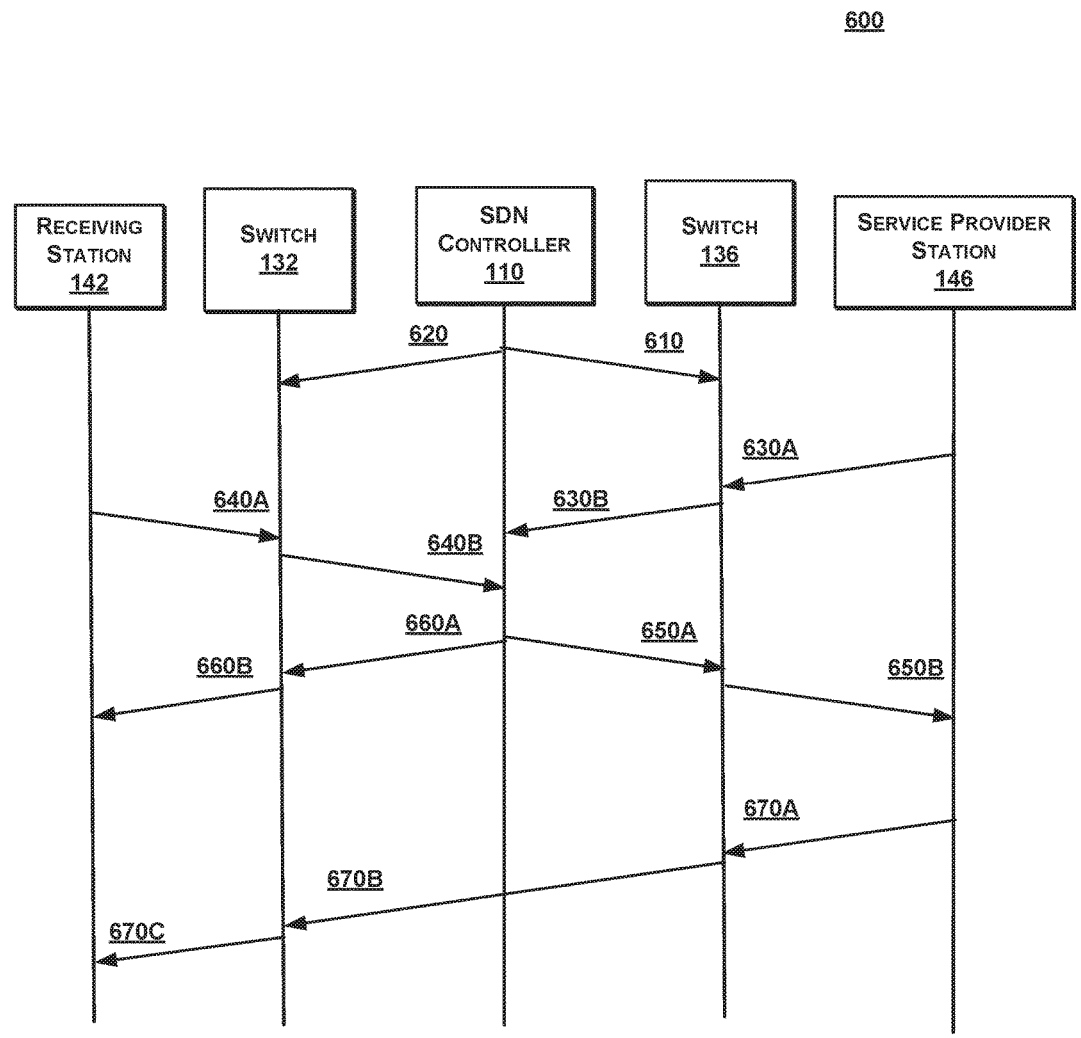
FIG. 6 is a sequence diagram illustrating interactions between components of the system of FIG. 1, according to some embodiments.

FIG. 6 is an interaction diagram illustrating example sequences of communications between components of the system 100. The methods operating within the components are discussion below. Alternative sets of interactions are possible based on, for example, tunneling protocols described above.

A flow is initiated between The SDN controller 110 sending OpenFlow rules to configure the switches 132, 136 (interactions 610,620). At some point thereafter, the multicast service provider 146 sends an advertisement broadcast request to the switch 136 which notifies the SDN controller 110 (interactions 630A,B). The receiving station 142, at some point, sends a service request to the switch 132 which also notifies the SDN controller 110 (interactions 640A,B). In response, OpenFlow rules are sent from the SDN controller 110 to the switch 132 and the switch 136, along with notifications passed to the service provider station 146 of the service request and passed to the receiving station (interactions 650A,B and 660A,B). A resulting stream of packets is sent from the multicast service provider 146 to the switch 136 which unicasts the packet stream to the switch 132 which multicasts (e.g., through just a particular port) to the receiving station (interactions 670A-C). Additional interactions can be included, for example, in embodiments which tunnel all packets to the SDN controller 110.

Figure 7:
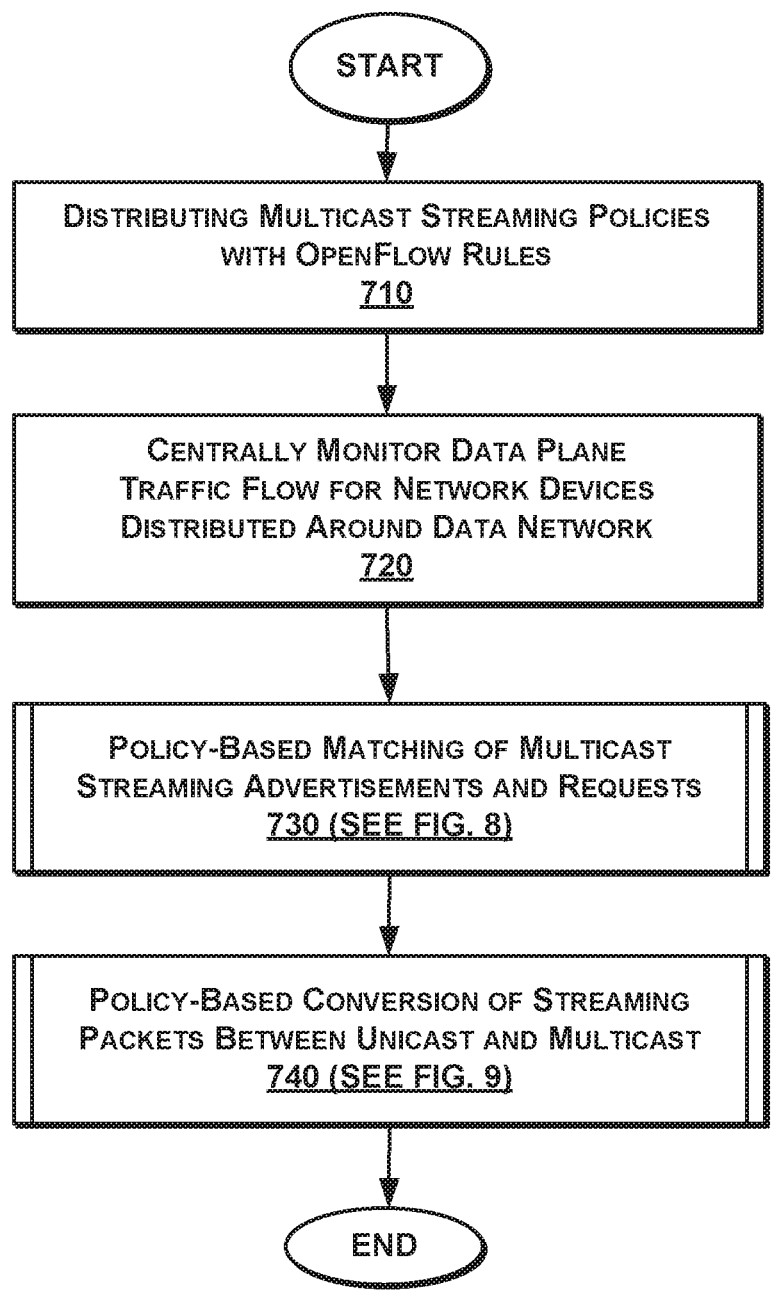
FIG. 7 is a high-level flow diagram illustrating a method for efficiently managing multicast service matching and streaming from a centralized data plane in a wireless communication network, according to one embodiment.
Figure 8:
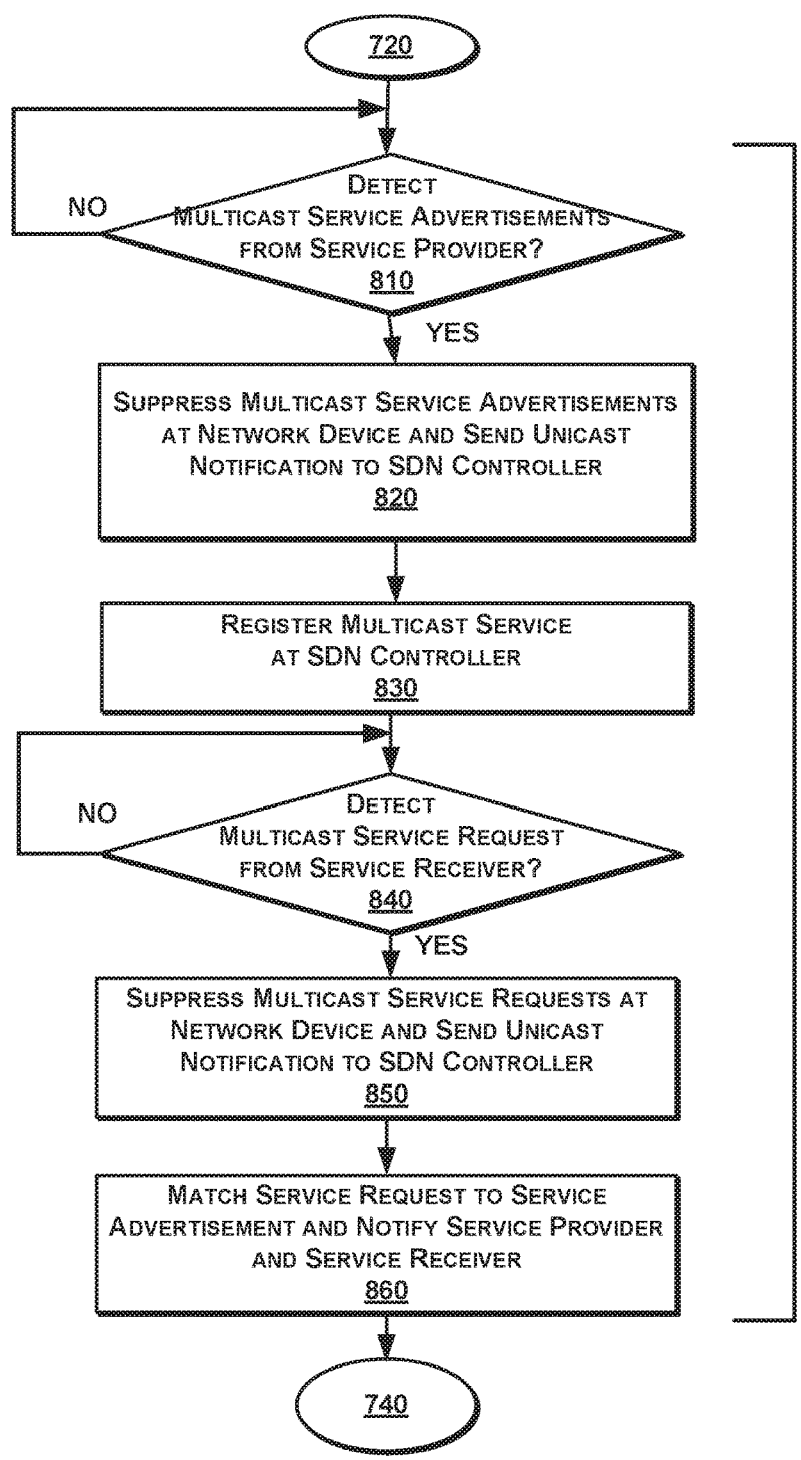
FIG. 8 is a more detailed flow diagram illustrating a step of service matching from FIG. 7, according to one embodiment.
Figure 9:
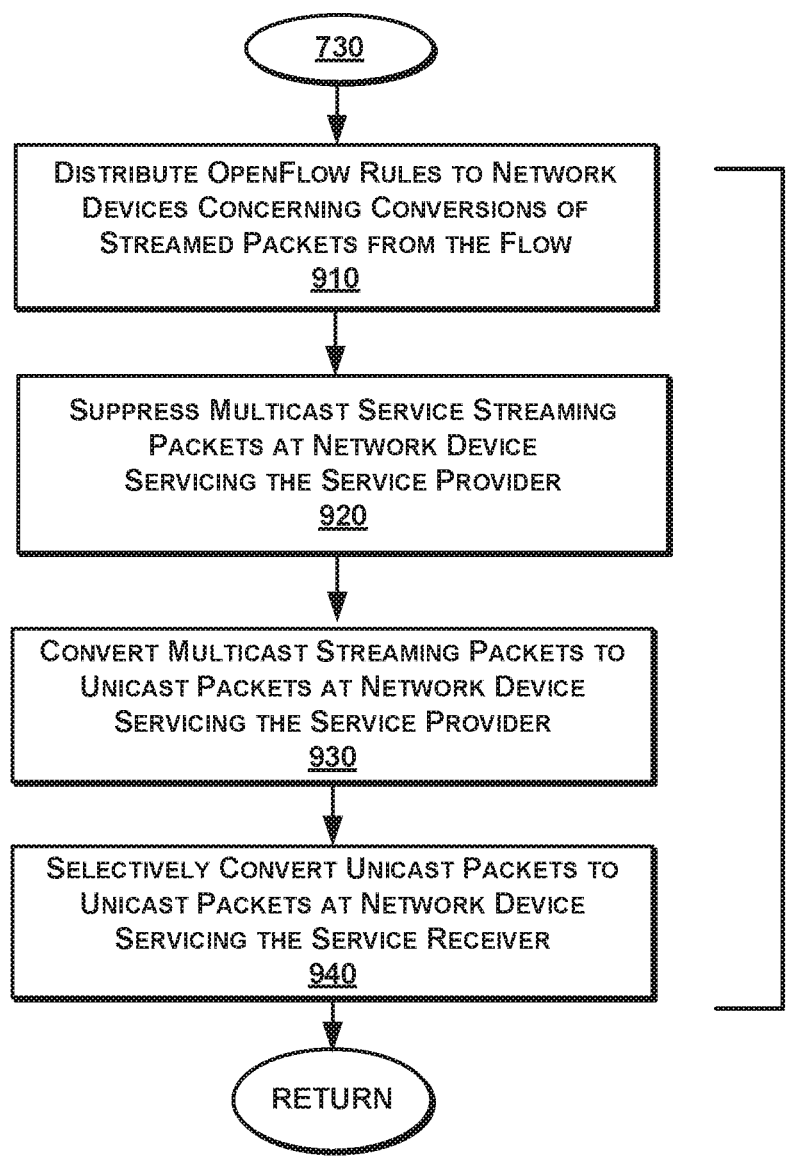
FIG. 9 is a more detailed flow diagram illustrating a step of streaming from FIG. 7, according to one embodiment.

Methods for Reducing Multicast Service Traffic with SDN (FIG. 7-9)

FIG. 7 is a high-level flow diagram illustrating a method for reducing multicast service traffic with SDN (e.g., in the SDN controller 110 of FIG. 1), according to one embodiment. One of ordinary skill in the art will recognize that the method 700 is non-limiting as other embodiments can have more or less steps and can be performed in a different order.

Multicast streaming policies are distributed using OpenFlow rules (step 710). Data plane traffic flow is centrally monitored for each of the network devices distributed around the wireless communication network, in particular to detect new data streams (step 720). Multicast streaming advertising and requests are matched based on multicast policies (step 730), as detailed in FIG. 8. Certain flows at an access point for multicast streaming convert certain multicast packets to unicast packets in between edge devices based on multicast policies (step 740), as detailed in FIG. 9.

FIG. 8 is a more detailed flow diagram illustrating the step 730 of multicast streaming advertising and request matches based on SDN policies, according to one embodiment.

Once multicast advertisements from the multicast service provider are detected (step 810), multicast service advertisements at the network device are suppressed and a unicast notification is sent to the SDN controller (step 820). The SDN controller registers the multicast service, for example, in a list of available multicast services or a list of network services (step 830). Separately, multicast service requests from service receivers are requested, for example, periodically, when powering up, or when joining a network (step 840). In response, multicast service requests are suppressed at the network device and a unicast notification is sent to the SDN controller (step 850). Service requests are matched to service advertisements (860). Selecting a match can be done automatically by comparing parameters of the advertisement and request, or manually by a user of the receiver station.

FIG. 9 is a more detailed flow diagram illustrating the step 740 of streaming packets between multicast and unicast conversions based on SDN policies, according to one embodiment.

OpenFlow rules concerning conversions of streamed packets are distributed to network devices (step 910). Multicast service streaming packets are suppressed at a network device (step 920). Multicast streaming packets are converted to unicast packets at a switch connected to a streaming service provider (step 930). One SDN policies maintains the streaming packets as unicast packets through network hops to different network devices between edge devices. Once arrived at the switch, packets are selectively converted from unicast back to multicast format (step 940). In more detail, when possible, the multicast packets are sent through a specific port rather than all ports. Packets are not replicated at ports that do not service receivers of the multicast service. Some embodiment force all stations receiving multicast service to certain ports.

Generic Computing Device (FIG. 10)

FIG. 10 is a block diagram illustrating an exemplary computing device 1000 for use in the system 100 of FIG. 1, according to one embodiment. The computing device 1000 is an exemplary device that is implementable for each of the components of the system 100, including the SDN controller 110, the Wi-Fi controller 120, the access points 130A-N, and the stations 140A-N. The computing device 1000 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 1000, of the present embodiment, includes a memory 1010, a processor 1020, a storage drive 1030, and an I/O port 1040. Each of the components is coupled for electronic communication via a bus 1099. Communication can be digital and/or analog, and use any suitable protocol.

The memory 1010 further comprises network applications 1012 and an operating system 1014. The network applications 1012 can include the modules of the SDN controller 110, the Wi-Fi controller 120, or the access point 130, as illustrated in FIGS. 3-5. Other network applications 1012 can include a web browser, a mobile application, an application that uses networking, a remote application executing locally, a network protocol application, a network management application, a network routing application, or the like.

The operating system 1014 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 1020 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 1020 can be single core, multiple core, or include more than one processing elements. The processor 1020 can be disposed on silicon or any other suitable material. The processor 1020 can receive and execute instructions and data stored in the memory 1010 or the storage drive 1030

The storage drive 1030 can be any non-volatile type of storage such as a magnetic disc, EEPROM (electronically erasable programmable read-only memory), Flash, or the like. The storage drive 1030 stores code and data for applications.

The I/O port 1040 further comprises a user interface 1042 and a network interface 1044. The user interface 1042 can output to a display device and receive input from, for example, a keyboard. The network interface 1044 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for efficient management of multicast services in a software-defined network (SDN) controller in a data communication network by centrally coordinating data plane behavior, the method comprising the steps of: distributing at least one OpenFlow rule from a multicast streaming policy comprising one or more OpenFlow rules to a plurality of network components involved in multicasting services, the at least one OpenFlow rule of the multicast streaming policy suppressing advertising packets that broadcast availability of a streaming service, and the at least one OpenFlow rule of the multicast streaming policy suppressing request packets for available streaming services; centrally monitoring data plane traffic flow of the data communication network, including receiving monitoring data from the plurality of network components from different locations on the data communication network; responsive to one or more advertising packets of a service provider being suppressed at a first network component of the plurality of network components, receiving notification of advertisement packets; responsive to one or more request packets of a station being suppressed at a second network component of the plurality of network components, receiving notification of a request packet; notifying the service provider and the station of a match based on matching parameters of the advertisement packets and the request packet; and distributing at least one OpenFlow rule of the multicast streaming policy to at least the network component associated with the service provider and to the network component associated with the receiving station, wherein the at least one OpenFlow rule concerns packets from a flow for streaming the multicast service are converted from multicast to unicast when sent from the network component associated with the service provider, and then are converted from unicast to multicast when received at the network component associated with the receiving station.

2. The method of claim 1, wherein suppressing the one or more advertisements comprises: refraining from transmitting copies of the service advertisement packets to a multicast address associated with the data packets.

3. The method of claim 1, wherein suppressing the one or more service requests comprises: refraining from transmitting copies of the service requests packets to a multicast address associated with the data packets.

4. The method of claim 1, further comprising: refraining from transmitting copies of the streaming packets received by the network component associated with the service provider to a multicast address associated with the data packets.

5. The method of claim 1, further comprising: refraining from transmitting copies of the streaming packets received by the network component associated with the service receiver to a multicast address associated with the data packets.

6. The method of claim 1, further comprising: determining a specific port from a plurality of ports to transmit the multicast packets that have been converted from a unicast packet, wherein the specific port facilitates a connection to the receiving device; and refraining from transmitting copies of the multicast packets to other ports of the plurality of ports that do not facilitate the connection to the receiving device.

7. The method of claim 1, further comprising: identifying the advertising packets, and parameters associated with the streaming service, using deep packet inspection.

8. The method of claim 1, wherein at least two of the plurality of network devices implementing the OpenFlow rules are manufactured by different vendors and have distinct operating systems.

9. A non-transitory computer-readable medium that, when executed by a processor, performs a computer-implemented method for efficient management of multicast services in a software-defined network (SDN) controller in a data communication network by centrally coordinating data plane behavior, the method comprising the steps of: distributing at least one OpenFlow rule from a multicast streaming policy comprising one or more OpenFlow rules to a plurality of network components involved in multicasting services, the at least one OpenFlow rule of the multicast streaming policy suppressing advertising packets that broadcast availability of a streaming service, and the at least one OpenFlow rule of the multicast streaming policy suppressing request packets for available streaming services; centrally monitoring data plane traffic flow of the data communication network, including receiving monitoring data from the plurality of network components from different locations on the data communication network; responsive to one or more advertising packets of a service provider being suppressed at a first network component of the plurality of network components, receiving notification of advertisement packets; responsive to one or more request packets of a station being suppressed at a second network component of the plurality of network components, receiving notification of a request packet; notifying the service provider and the station of a match based on matching parameters of the advertisement packets and the request packet; and distributing at least one OpenFlow rule of the multicast streaming policy to at least the network component associated with the service provider and to the network component associated with the receiving station, wherein the at least one OpenFlow rule concerns packets from a flow for streaming the multicast service are converted from multicast to unicast when sent from the network component associated with the service provider, and then are converted from unicast to multicast when received at the network component associated with the station.

10. A software-defined networking (SDN) controller for efficient management of multicast services in a software-defined network (SDN) controller in a data communication network by centrally coordinating data plane behavior, the SDN controller comprising: a processor; a network interface; a memory, storing a multicast streaming policy manager, a data plane manager, and an available services tracker, wherein the multicast streaming policy manager distributes a packet conversion policy comprising one or more OpenFlow rules to a plurality of network components involved in multicasting services, at least one OpenFlow rule of the packet conversion policy suppressing advertising packets that broadcast availability of a streaming service, and at least one OpenFlow rule of the packet conversion policy suppressing request packets for available streaming services, wherein the data plane manager centrally monitors data plane traffic flow of the data communication network, including receiving monitoring data from the plurality of network components from different locations on the data communication network, and wherein the available service tracker to, responsive to one or more advertising packets of a service provider being suppressed at a first network component of the plurality of network components, receive notification of advertisement packets, the available service tracker to, responsive to one or more request packets of a station being suppressed at a second network component of the plurality of network components, receive notification of a request packet, and the available service tracker to notify the service provider and the station of a match based on matching parameters of the advertisement packets and the request packet, wherein the multicast streaming policy manager distributes at least one OpenFlow rule to at least the network component associated with the service provider and to the network component associated with the station, wherein packets from a flow for streaming the multicast service are converted from multicast to unicast when sent from the network component associated with the service provider, and then are converted from unicast to multicast when received at the network component associated with the station.

11. The SDN controller of claim 10, further comprising: a deep packet inspection engine stored n the memory to analyze forwarded packets to identify the advertising packets of the service provider and request packets of the receiving station.

* * * * *